(12) United States Patent
Matsuki et al.

(10) Patent No.: US 6,629,161 B2
(45) Date of Patent: Sep. 30, 2003

(54) DATA PROCESSING SYSTEM AND DATA PROCESSING METHOD

(75) Inventors: Hiroyuki Matsuki, Tenri (JP); Kensuke Takai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 317 days.

(21) Appl. No.: 09/842,900

(22) Filed: Apr. 27, 2001

(65) Prior Publication Data
US 2002/0013867 A1 Jan. 31, 2002

(30) Foreign Application Priority Data
Apr. 28, 2000 (JP) ........................ 2000-131752

(51) Int. Cl.[7] ................ G06F 13/14; G06F 13/28
(52) U.S. Cl. .................. 710/22; 710/24; 710/26; 710/33; 710/34
(58) Field of Search ................ 710/22, 24, 26, 710/33, 34

(56) References Cited

U.S. PATENT DOCUMENTS 6,415,345 B1 * 7/2002 Wu et al. ................ 710/305
6,571,301 B1 * 5/2003 Nakahara ................ 710/31

FOREIGN PATENT DOCUMENTS

JP     A54891 1     2/1993

\* cited by examiner

*Primary Examiner*—Rehana Perveen
(74) *Attorney, Agent, or Firm*—Birch, Stewart, Kolasch & Birch, LLP

(57) ABSTRACT

A data processing system comprises: a plurality of data processing modules for performing a series of data processing, wherein each of the plurality of data processing modules processes data; a bus connected to each of the plurality of data processing modules; a memory controller for writing the data processed by each of the plurality of data processing modules into a memory via the bus, and for reading out the written data from the memory via the bus; a DMA controller for determining operation of each of the plurality of data processing modules, and outputting an address to the memory controller, the data processed by said data processing module being written at the address and the DMA controller including a data parallel processing control section. The plurality of data processing modules includes first and second data processing modules, and the second data processing module is subsequent to the first data processing module in the series of processing. The DMA controller has a coordinate counter for managing the address, and according to a value of the coordinate counter, the DMA controller controls the first and second data processing modules so that the second data processing module starts data processing before the first data processing module completes data processing.

7 Claims, 9 Drawing Sheets

DATA PROCESSING SYSTEM AND DATA PROCESSING METHOD

BACKGROUND OF THE INVENTION

1. Field of the Invention

The present invention relates to a data processing system and a data processing method.

2. Description of the Related Art

An example data processing system is an image data processing system including a plurality of image data processing sections which are combined so as to conduct a series of data processing.

Such an image data processing system is, for example, employed in a digital still camera or the like, in which a plurality of image data processing sections are combined so as to conduct a series of data processing. In a digital still camera, after image data is taken by a CCD module, the camera needs to perform: color density conversion, such as color space conversion of the RGB values (color signals) of a Bayer's array to YUV values (brightness signals and color difference signals), auto iris (adjustment of an output value depending on light and shade), and white balance (color adjustment); compression of an image into a JPEG format; and the like. If such image data processing is sequentially executed, the processing time is simply accumulated and the overall processing time is considerably long. In this case, for a digital still camera or the like, a quick response is impaired for taking an image. An example image data processing system will be described below with reference to FIG. 8.

FIG. 8 is a block diagram illustrating a structure of a conventional image data processing system. In FIG. 8, an image data processing system 800 includes: a plurality of image data processing modules A through C; a memory controller 103 which accesses an external memory 102 (data write and read); a single bus 101 shared by the image data processing modules A through C, which connects the image data processing modules A through C and the memory controller 103; and a DMA (Direct Memory Access) controller 104 which controls the image data processing modules A through C and the memory controller 103. The image data processing modules A through C each generally perform different image data processing for input data. Note that the image data processing modules are examples of a data processing module.

The image data processing module A processes image data received from an input section 105. A result of the data processing (referred to as data A) is output via the bus 101 to the memory controller 103. Data A is written by the memory controller 103 into the memory 102 at an address which is output from the DMA controller 104.

Thereafter, data A is readout from the memory 102 by the memory controller 103, and read data A is then input via the bus 101 to the image data processing module B. The image data processing module B processes the received data A. Thereafter, a result of the data processing (referred to as data B) is output via the bus 101 to the memory controller 103. Data B is written by the memory controller 103 into the memory 102 at another address which is output from the DMA controller 104.

Thereafter, data B read out from the memory 102 by the memory controller 103 is input via the bus 101 to the image data processing module C which in turn processes data B. Thereafter, a result of the data processing (referred to as data C) is output to the output section 106.

As described above, when the image data processing modules A through C perform data processing in sequence, the overall data processing time is a sum of each image data processing time. Thus, it takes a long time to perform the entire image data processing. In this case, for a digital still camera or the like, a quick response is impaired for taking an image.

Japanese Laid-Open Publication No. 5-48911 discloses a method for solving such a problem, for example.

FIG. 9 is a schematic block diagram illustrating an image data processing system 900 in which data processing is sped up by adopting conventional pipeline processing.

The pipeline processing is a method in which one process is divided into n separate processing steps which are arranged on a line, and the processing steps are conducted in parallel. In the pipeline processing, a series of data processing results are successively obtained every one $n^{th}$ of a time required for processing the entire processing.

In FIG. 9, the image data processing system 900 includes: an image data processing module D which processes image data received from an input section 901; a temporary retaining memory 902 which temporarily stores a result of the data processing by the image data processing module D; an image data processing module E which processes the data processing result stored in the temporary retaining memory 902; a temporary retaining memory 903 which temporarily stores a result of the data processing by the image data processing module E; an image data processing module F which processes the data processing result stored in the temporary retaining memory 903; an output section 904 which outputs the data processing result by the image data processing module F. These sections, modules and memories are arranged in the form of a pipeline in terms of time and address space. In the image data processing system 900, a subsequent stage starts data processing partway through data processing in a previous stage (the previous stage means one of the image data processing modules which is positioned at the input side before the subsequent stage, and the subsequent stage means one of the image data processing modules which is positioned at the output side after the previous stage). Therefore, such parallel data processing leads to a reduction in the overall data processing time.

In "an image reading apparatus and a digital copying apparatus" disclosed in Japanese Laid-Open Publication No. 5-48911, data processing modules are arranged in the form of a pipeline so as to speed up the digital data processing of the copying apparatus. In Japanese Laid-Open Publication No. 5-48911, a document reader (corresponding to the image data processing module D) reads a document, partway through which an encoder (corresponding to the image data processing module E) starts encoding, and subsequently a decoder (corresponding to the image data processing module F) starts decoding partway through the encoding process by the encoder. Thus, a plurality of image data processes are conducted in parallel for a certain period of time, thereby reducing the overall processing time for an entire image data.

More specifically, in the image reading apparatus and the digital copying apparatus disclosed in Japanese Laid-Open Publication No. 5-48911, two memories (corresponding to the temporary retaining memory 902 shown in FIG. 9) each capable of storing data of the number of horizontal pixels multiplied by 8 lines are provided between the document reader and the encoder. The encoder requires data of 8×8 pixels for a unit process. The encoder starts encoding when data of 8 lines are stored after the start of outputting of the document reader. Similarly, the decoder also starts decoding partway through the encoding process of the encoder. Thus, the reading, encoding, decoding, and outputting processes are executed in parallel at the same rate, thereby reducing the overall processing time for an entire image data.

However, the pipeline processing as described in Japanese Laid-Open Publication No. 5-48911 cannot be applied to the CCD data processing (reading, encoding, decoding and outputting) of the above-described digital still camera. In CCD data processing, a previous image data processing module cannot wait image data processing, and a subsequent image data processing module cannot delay image data processing if the temporary retaining memory 902 or 903 is likely to overflow.

Further, if a subsequent image data processing module processes image data faster than a previous image data processing module does, the subsequent image data processing module adversely overtakes the previous image data processing module. In this case, the above-described pipeline processing is impossible.

Therefore, when a plurality of data processing modules have different data processing rates, the above-described pipeline processing is impossible. The overall processing time for an entire image data cannot be reduced.

SUMMARY OF THE INVENTION

According to one aspect of the present invention, a data processing system comprises: a plurality of data processing modules for performing a series of data processing, wherein each of the plurality of data processing modules processes data; a bus connected to each of the plurality of data processing modules; a memory controller for writing the data processed by each of the plurality of data processing modules into a memory via the bus, and for reading out the written data from the memory via the bus; a DMA controller for determining operation of each of the plurality of data processing modules, and outputting an address to the memory controller, the data processed by said data processing module being written at the address and the DMA controller including a data parallel processing control section. The plurality of data processing modules includes first and second data processing modules, and the second data processing module is subsequent to the first data processing module in the series of processing. The DMA controller has a coordinate counter for managing the address, and according to a value of the coordinate counter, the DMA controller controls the first and second data processing modules so that the second data processing module starts data processing before the first data processing module completes data processing.

When a bus is sufficiently fast for each data processing, data input and data output of a previous data processing module are intermittent, so that a DMA controller allows another data processing module to receive or output data. Therefore, even when each data processing module has a different rate, a previous data processing module and a subsequent data processing module can be conducted in parallel, and the overall processing time required for an entire image data processing can be reduced.

In one embodiment of this invention, the data parallel processing control section includes a no-overtake control section, wherein when the second data processing module has a faster processing rate than that of the first data processing module, no pass control is applied to the second data processing module so that the second data processing module is prevented from overtaking the first data processing module in terms of the data processed.

Even when the data processing rate of a subsequent data processing module is faster than the data processing rate of a previous data processing module, the subsequent data processing module can be prevented from overtaking the previous data processing module. Therefore, data processing can be satisfactorily conducted in the previous and subsequent data processing modules.

In one embodiment of thin invention, the no-overtake control section ends operation of the no-overtake control after the first data processing module completes data processing.

If a difference between each count value is continuously controlled so as not to be less than or equal to a given value after a previous data processing module has completed its task, a subsequent data processing module cannot complete its task. To avoid this, no-overtake control is disabled so that final data can be subjected to data processing.

In one embodiment of this invention, in the series of data processing, a plurality of processing lines branch from a single processing line.

In one embodiment of this invention, in the series of data processing, a plurality of processing lines are merged into a single processing line.

Data processing may not be a single line. For example, input data from a CCD or the like may be divided into a brightness component and a color component which are subjected to different processing. In other words, a certain image data processing module may have a plurality of outputs, or conversely, a plurality of inputs and a single output. Even in such a case, data processing can be sped up. Even when data processing is not always sequential and includes processing branches, the data processing can be sped up.

In one embodiment of this invention, the data processed in the series of data processing is image data.

The data processing system of the present invention can be easily and satisfactorily applied to an image data processing system. Especially in the case of image data, since image data has a great amount of data compared with typical data, a reduction in processing time is significant in the present invention.

According to another aspect of the present invention, a data processing method for use in a data processing system including a plurality of data processing modules each connected to a bus, and a DMA controller for controlling each of the plurality of data processing modules, the plurality of data processing modules including first and second data processing modules, comprises the steps of: a) processing data using the first data processing module; and b) processing the data processed by the first data processing module, using the second data processing module before the first data processing module completes data processing. The DMA controller controls the second data processing module so that in step b, the second data processing module is prevented from overtaking the first data processing module in terms of the data processed.

Thus, the invention described herein makes possible the advantages of providing a data processing system and a data processing method which can reduce the overall processing time even when a plurality of data processing sections each have a different data processing rate.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

An example of data handled by a data processing system is image data. An image data processing system handling image data will be herein described in detail. The image data processing system is an example of a data processing system. An image data processing system to which a data processing system according to the present invention is applied, will be described.

EXAMPLE 1

Figure 1:
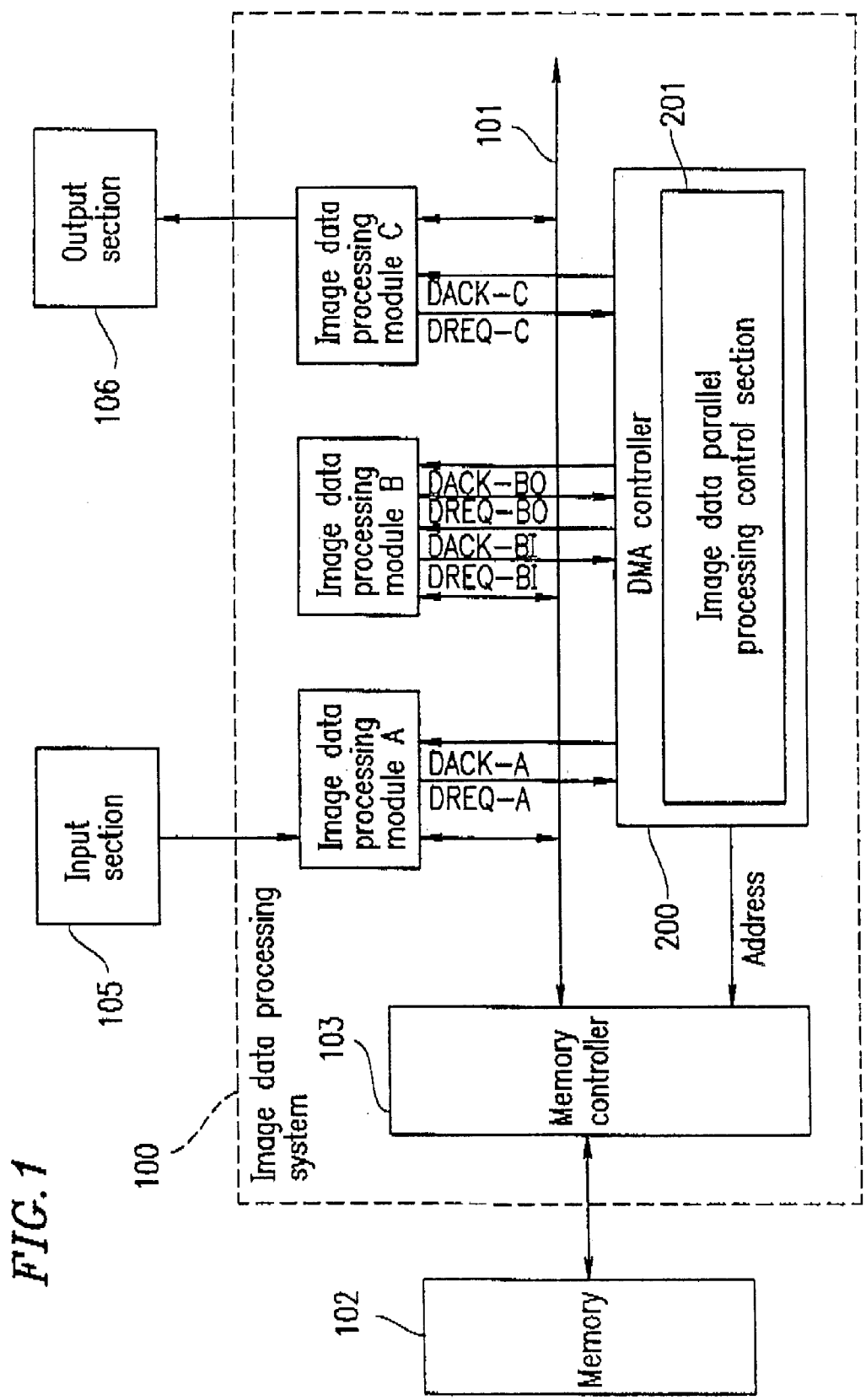
FIG. 1 is a block diagram illustrating an example structure of an image data processing system according to Example 1 of the present invention.
Figure 8:
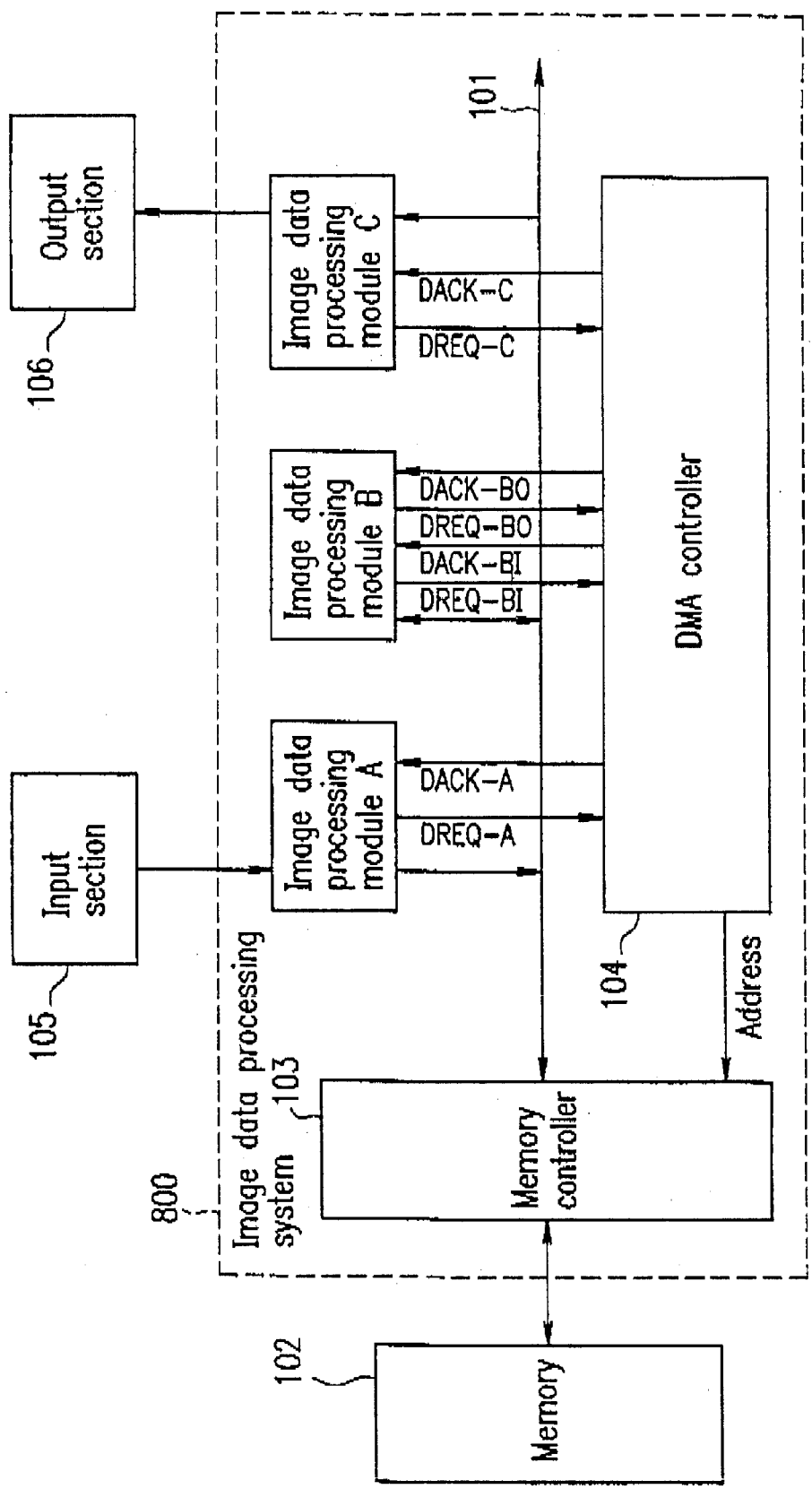
FIG. 8 is a block diagram illustrating a structure of a conventional image data processing system.
Figure 9:
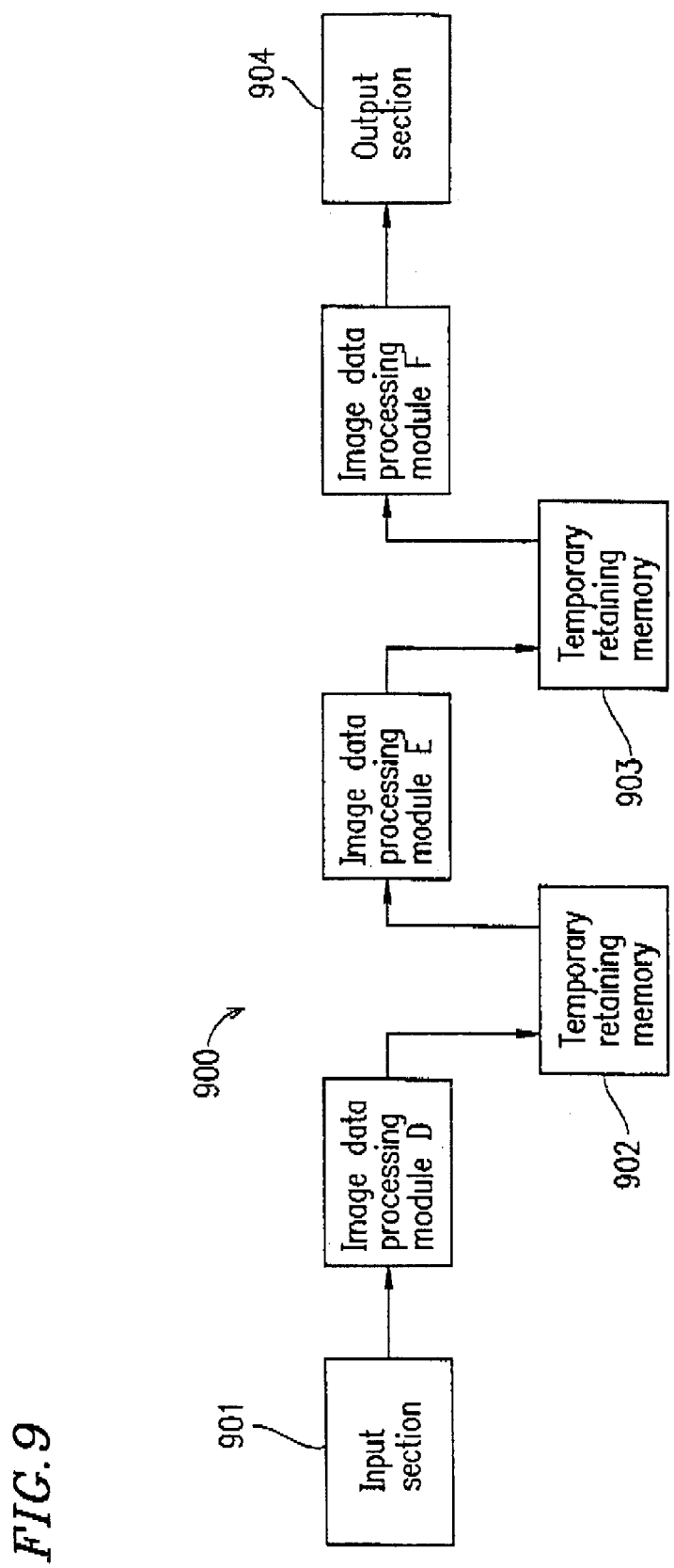
FIG. 9 is a block diagram illustrating an image data processing system in which data processing is sped up by adopting conventional pipeline processing.

FIG. 1 is a block diagram illustrating an example structure of an image data processing system 100 according to Example 1 of the present invention. Components functioning similarly to the corresponding components shown in FIG. 8 are designated by the same reference numerals as used in FIG. 8. The description of such components is therefore omitted. In Example 1, for the sake of simplicity, input image data received from an input section 105 is subjected to three successive steps of data processing, thereby realizing a series of image data processing. The term "a series of image data processing" means that different image data processes are successively conducted. However, the same processing operation may be achieved by different image data processing modules.

In FIG. 1, an image data processing system 100 includes: a plurality of image data processing modules A through C; a memory controller 103 which accesses an external memory 102 (for data write and read); a single bus 101 shared by the image data processing modules A through C, which connects the image data processing modules A through C and the memory controller 103; and a DMA controller 200 which controls the image data processing modules A through C and the memory controller 103. In FIG. 1, although the memory 102 is provided outside the image data processing system 100, the memory 102 may be included in the image data processing system 100. The DMA controller 200 includes an image data parallel processing control section 201 for processing image data in parallel.

The image data processing modules A through C conduct a series of image data processing. The image data processing modules A through C each have a temporary storage section for temporarily storing a small amount of data (e.g., image data of one line). The temporary storage section may function at least either as an input buffer or an output buffer. A temporary storage section provided at an input side of the image data processing module A and a temporary storage section provided at an output side of the image data processing module C may be a memory. With the temporary storage section, the processing time of each image data processing module A through C is absorbed by a storage capacity of the buffer, whereby data input and data output can be conducted at a high rate via the single bus 101. Therefore, data input and data output in a data processing module are intermittent, so that the DMA controller 200 allows another data processing module to use the bus 101 at a break in the data input and the data output.

The image data processing module A sequentially processes image data received from the input section 105. A result of the data processing (referred to as data A) is stored in the temporary storage section of the image data processing module A in a predetermined quantity. The image data processing module A issues a DMA request signal (DREQ-A) to the DMA controller 200, if there is data to be written into the memory 102. Thereafter, the image data processing module A outputs data A to the memory controller 103 when a DMA acknowledge signal (DACK-A) is issued by the DMA controller 200. In this case, the memory controller 103 writes data A into the memory 102.

The image data processing module B has an input and an output, to each of which a DMA channel is assigned. Subsequently, the image data processing module B issues a DMA request signal (DREQ-BI) to the DMA controller 200 when the image data processing module B is ready to process image data. When a DMA acknowledge signal (DACK-BI) is input from the DMA controller 200 to the image data processing module B, data A is read out from the memory 102 by the memory controller 103 and then input to the image data processing module B which in turn subjects data A to predetermined data processing. Upon writing the resultant data (referred to as data B) into the memory 102, the image data processing module B issues a DMA request signal (DREQ-BO) to the DMA controller 200. Thereafter, the image data processing module B outputs data B via the bus 101 to the memory controller 103 when a DMA acknowledge signal (DACK-BO) is issued from the DMA controller 200 to the image data processing module B. The memory controller 103 writes data B into the memory 102.

Further, the image data processing module C issues a DMA request signal (DREQ-C) to the DMA controller 200 when the image data processing module C is ready to receive data. When a DMA acknowledge signal (DACK-C) is issued from the DMA controller 200 to the image data processing module C, data B is read out from the memory 102 by the memory controller 103 and then input via the bus 101 to the image data processing module C.

The data B is processed by the image data processing module C. The resultant data (referred to as data C) is output to the output section 105. Data C is output to the memory controller 103 and then written into the memory 102 if necessary.

The DMA controller 200 has an image data parallel processing control section 201 (data parallel processing control section) by which the DMA controller 200 actuates a subsequent image data processing module before a previous image data processing module completes its task, depending on the value of a coordinate counter 24 (FIG. 3) described later. The term "previous (image) data processing module" herein means a (image) data processing module which processes data temporally before another data processing module, while the term "subsequent (image) data processing module" herein means a (image) data processing module which processes data temporally after another data processing module.

Figure 2:
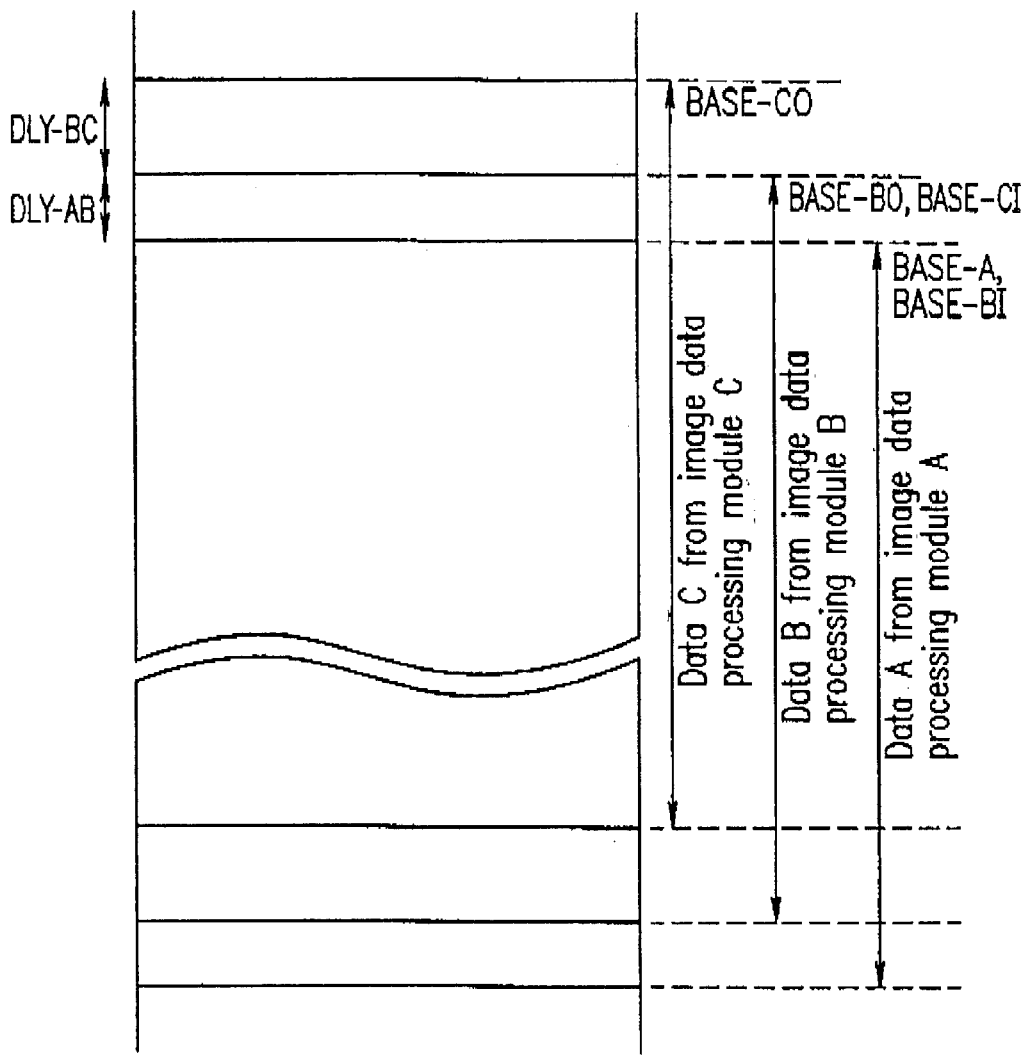
FIG. 2 is a diagram illustrating address assignment in the image data processing system of FIG. 1, in which memory regions used for image data processing modules in the image data processing system are overlapped with one another.

FIG. 2 is a diagram illustrating address assignment in the image data processing system 100 of FIG. 1, in which memory regions used for the image data processing modules are overlapped with one another. In FIG. 2, data A resulting from the image data processing module A is written after a base address BASE-A and read out from a base address BASE-BI, and data B resulting from the image data processing module B is written after a base address BASE-BO and read out from a base address BASE-CI. In the foregoing description with reference to FIG. 1, data C resulting from the image data processing module C is written after a base address BASE-CO. Part of data A, B and C corresponding to the overlapped regions can be processed in parallel, resulting in a reduction in the overall processing time.

As shown in the example address assignment of FIG. 2, data processed by the image data processing modules are written in a memory space in the memory 102 in parallel. The DMA controller 200 determines which image data processing is conducted, based on the priority, the channel status, and the like so as to enable the image data processing system 100 to perform image data processing in parallel. Specifically, the DMA controller 200 changes the channels and issues the DMA acknowledge signals (DACK-A, DACK-BI, DACK-BO, DACK-C) which enable each image data processing module A through C. The DMA controller 200 having an image data parallel processing control section 201 will be described below with reference to FIG. 3.

Figure 3:
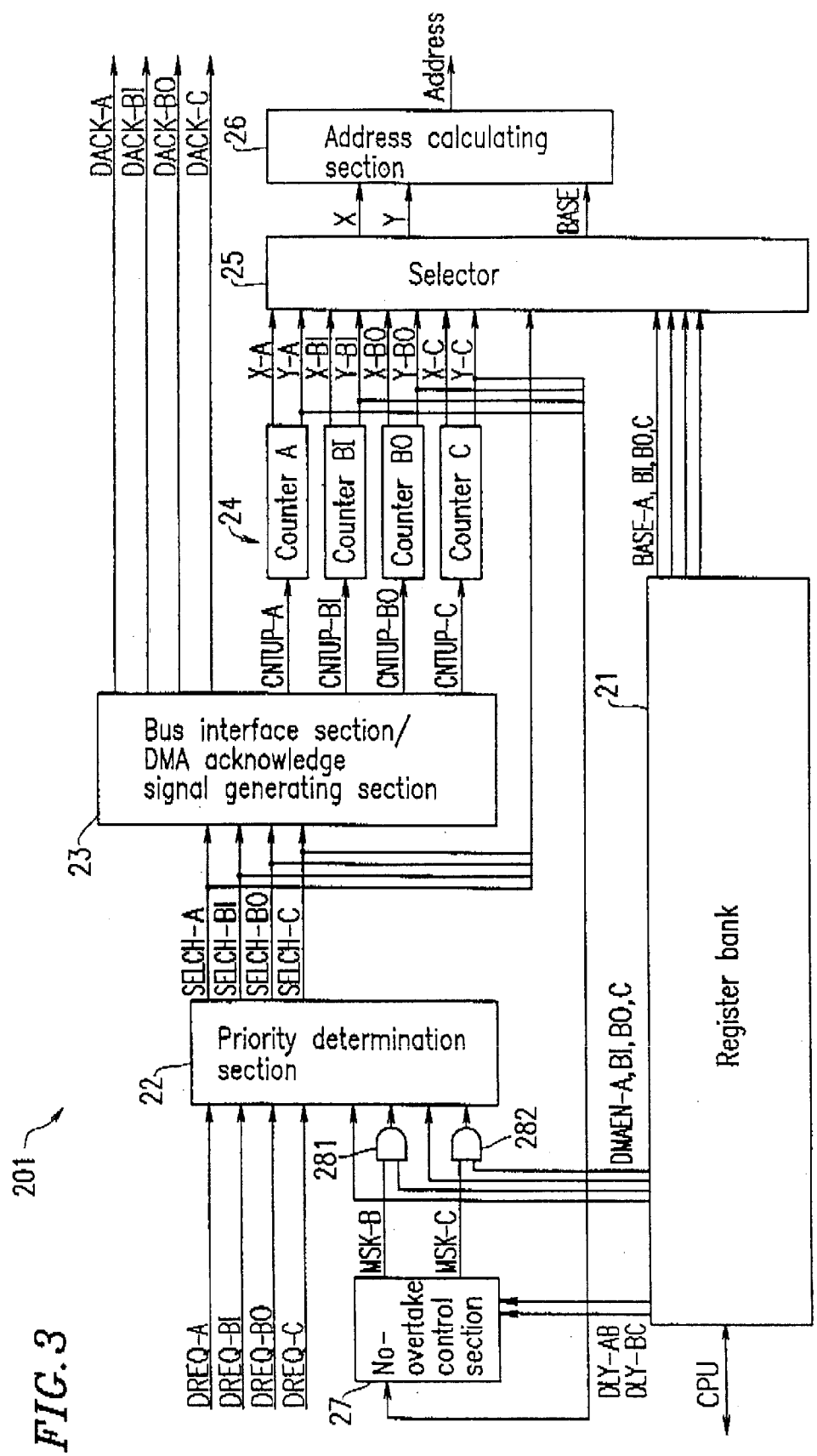
FIG. 3 is a block diagram illustrating a structure of an image data parallel processing control section shown in FIG. 1 having a no-overtake control function.

FIG. 3 is a block diagram illustrating a structure of the image data parallel processing control section 201 having an image data parallel processing control function. In FIG. 3, the image data parallel processing control section 201 includes a register bank 21, a priority determination section 22, a bus interface section/DMA acknowledge signal generating section 23, a plurality of coordinate counters 24, a selector 25, an address calculating section 26, and a no-overtake control section 27.

The register bank 21 is controlled by a CPU (central processing unit, not shown). The register bank 21 outputs a channel enable signal (DMAEN-A, DMAEN-BI, DMAEN-BO, DMAEN-C) to the priority determination section 22. The DMAEN-BI channel enable signal and the DMAEN-C channel enable signal are input via AND gates 281 and 282 to the priority determination section 22, respectively. The register bank 21 outputs a base address signal (BASE-A, BASE-BI, BASE-BO, BASE-C) to the selector 25. The term "base address signal" means a signal used for setting a base address. Further, the register bank 21 outputs to the no-overtake control section 27 an actuation delaying signal (DLY-AB, DLY-BC) indicating the number of delayed lines for each image data processing module A through C.

The priority determination section 22 receives a DMA request signal (DREQ-A, DREQ-BI, DREQ-BO, DREQ-C) output from each image data processing module A through C. Thereafter, the priority determination section 22 outputs a select channel signal (SELCH-A, SELCH-BI, SELCH-BO, SELCH-C) indicating which channel (which of image data processing module A through C) is enabled, in response to the channel enable signal (DMAEN-A, DMAEN-BI, DMAEN-BO, DMAEN-C).

The bus interface section/DMA acknowledge signal generating section 23 receives the select channel signal (SELCH-A, SELCH-BI, SELCH-BO, SELCH-C) from the priority determination section 22, and generates the DMA acknowledge signal (DACK-A, DACK-BI, DACK-BO, DACK-C) indicating which of the image data processing module A through C is enabled, to output the DMA acknowledge signal to a corresponding image data processing module A through C. Further, the bus interface section/DMA acknowledge signal generating section 23 outputs a count-up signal (CNTUP-A, CNTUP-BI, CNTUP-BO, CNTUP-C) to the plurality of coordinate counters 24.

A plurality of the coordinate counters 24 are provided per channel of each image data processing module A through C, and output count values (X-A, X-BI, X-BO and X-C, and Y-A, Y-BI, Y-BO and Y-C) for horizontal and vertical coordinates (two-dimensional image coordinates) for each channel (such values are hereinafter also referred to as horizontal count values and vertical count values, respectively). The count value of a coordinate counter 24 indicates the position of an address in a memory space at which data processing exists.

The selector 25 outputs to the address calculating section 26: the count values (X and Y) corresponding to the select channel signal (SELCH-A, SELCH-BI, SELCH-BO, SELCH-C) from the priority determination section 22; and the base address signal (BASE) received from the register bank 21.

The address calculating section 26 performs a calculation (e.g., BASE+Y×(X width)+X) based on the count values (X and Y) and the base address signal (BASE) from the selector 25 to automatically produce an address in the memory 102 (an address in a memory space). The address is output to the memory controller 103.

The no-overtake control section 27 receives the count value (Y-A, Y-BO) in the vertical direction from the plurality of coordinate counters 24 in an output channel, and the actuation delay signal (DLY-AB, DLY-BC) indicating the predetermined number of delayed lines from the register bank 21. The no-overtake control section 27 compares the count value (Y-A, Y-BO) with the actuation delaying signal (DLY-AB, DLY-BC), and delays the start of subsequent data processing by the predetermined number of lines from previous data processing. In this case, the number of delayed lines is designed so as to avoid the subsequent data processing from overtaking the previous data processing, taking into consideration the difference in data processing rate between the subsequent data processing and the previous data processing.

Figure 4:
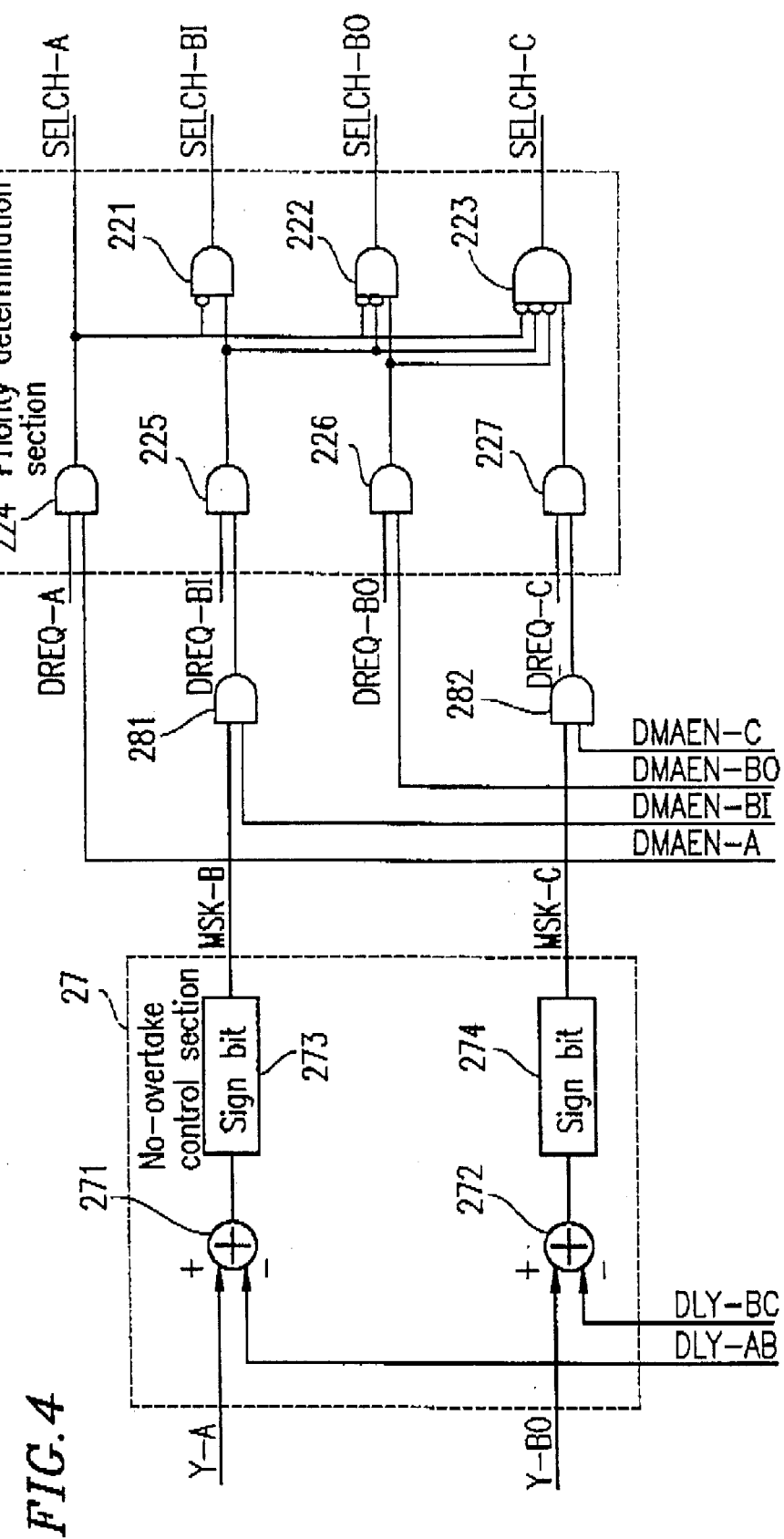
FIG. 4 is a block diagram illustrating a priority determination section and a no-overtake control section shown in FIG. 3.

FIG. 4 is a block diagram illustrating the priority determination section 22 and the no-overtake control section 27.

The priority determination section 22 includes AND gates 221 through 227. The priority determination section 22 selects an enabled channel using the AND gates 221 through 223 in accordance with the priority which has been predetermined by the channel enable signal. When a channel is disabled, i.e., a channel enable signal DMAEN from the register bank 21 is equal to 'L', the DMA request signals (DREQ-A, DREQ-BI, DREQ-BO, DREQ-C) from the image data processing modules A through C each are masked by the AND gates 224 through 227 to be disabled.

The no-overtake control section 27 includes subtracters 271 and 272, and most significant sign bit detectors 273 and 274. The subtracter 271 receives a count value for the vertical coordinate (Y-A) from the coordinate counter 24, and a predetermined value of the number of delayed lines (actuation delaying signal DLY-AB) which is allowed by the register of the DMA controller 200. The output of the subtracter 271 is input to the most significant sign bit detector 273. The most significant sign bit of the output of the subtracter 271 is output as an MSK-B signal by the most significant sign bit detector 273. The subtracter 272 receives a count value for the vertical coordinate (Y-BO) from the coordinate counter 24, and a predetermined value of the number of delayed lines (actuation delaying signal DLY-BC) which is allowed by the register of the DMA controller 200. The output of the subtracter 272 is input to the most significant sign bit detector 274. The most significant sign bit of the output of the subtracter 272 is output as an MSK-C signal by the most significant sign bit detector 274.

AND gates 281 and 282 are provided between the priority determination section 22 and the no-overtake control section 27. The AND gate 281 receives the MSK-B signal and the channel enable signal DMAEN-BI. The output of the AND gate 281 is input to an AND gate 225 of the priority determination section 22. The AND gate 282 receives the MSK-C signal and the channel enable signal DMAEN-C. The output of the AND gate 282 is input to an AND gate 227 of the priority determination section 22.

For a period of time in which the vertical count value (Y-A) from the coordinate counter 24 of a previous data processing module is less than the predetermined value of the number of delayed lines (actuation delaying signal DLY-AB) which can be allowed to be set in the register of the DMA controller 200, the most significant sign bit of the output of the subtracter 271 (which actually performs subtraction) is 'H', and therefore the MSK-B signal is at a 'H' level. The 'H' level MSK-B signal and the channel enable signal (DMAEN-BI) are masked by the AND gate 281 to disable the channel.

Further, in the no-overtake control section 27, for a period of time in which the vertical count value (Y-A) from the coordinate counter 24 of a previous data processing module is greater than or equal to the predetermined value of the number of delayed lines (actuation delaying signal DLY-AB) which can be allowed to be set in the register of the DMA controller 200, the most significant sign bit (i.e., the MSK-B signal) of the output of the subtracter 271 is 'L', and therefore the MSK-B signal is at a 'L' level. As a result, the image data processing module B is automatically allowed to use the bus 101.

Furthermore, in the no-overtake control section 27, for a period of time in which the count value for the vertical coordinate (Y-BO) from the coordinate counter 24 of a previous data processing module is less than the predetermined value of the number of delayed lines (actuation delaying signal DLY-BC) which can be allowed to be set in the register of the DMA controller 200, the sign bit (i.e., the MSK-C signal) of the output of the subtracter 272 (which actually performs subtraction) and the channel enable signal (DMAEN-C) are masked by the AND gate 282 to disable the channel. When the vertical count value (Y-BO) from the coordinate counter 24 of a previous data processing module is greater than the set value in the register, the sign bit (i.e., the MSK-C signal) of the subtracter 272 is at a 'H' level and a mask for DREQ-C is removed, so that the image data processing module C starts image data processing.

The operation of the thus-constructed structure will be described below. The three image data processing modules A through C, which perform respective image data processing, output respective DMA request signals to the DMA controller 200. The DMA request signals are allowed by DMA acknowledge signals from the DMA controller 200. Thereafter, the image data processing modules A through C perform data input and data output via the single bus 101 and access the shared memory 102 in accordance with addresses automatically generated by the DMA controller 200.

In this case, the DMA controller 200 determines which of the image data processing modules A through C is allowed to use the shared bus 101, and controls the automatic address generation for memory access. In the image data parallel processing control section 201, as shown in FIG. 4, the no-overtake control section 27 selects a channel in accordance with the priority predetermined by the priority determination section 22. When the channel is not allowed to be used, i.e., the channel enable signal (DMAEN-A, BI, BO, C) is at an 'L' level, the DMA request signal from a subsequent image data processing module is masked to be disabled until the count values (X, Y) representing the coordinates of the data processing of a previous image data processing module reaches the predetermined number of delayed lines DLY. Therefore, the subsequent image data processing module starts data processing before the data processing of the previous image data processing module is completed. Thus, the image data processing modules A through C process data in parallel in the memory address space of the memory 102. In this case, a DMA request signal from a previous image data processing module is intermittent, so that during a break of the DMA request signal, a DMA request signal from another data processing module can be received. Therefore, even when each data processing has a different rate, the overall processing time required for the entire image data processing can be reduced.

Specifically, for the image data processing modules A and B, for a period of time in which the vertical count value (Y-A) output from the previous data processing module is less than the predetermined value of the number of delayed lines (actuation delaying signal DLY-AB) which is allowed by the register of the DMA controller 200, the most significant sign bit (i.e., the MSK-B signal) of the output of the subtracter 271 and the channel enable signal (DMAEN-BI) are masked by the AND gate 281 to disable the channel. Thereafter, the image data processing module A further proceeds in its processing. When the count value (Y-A) becomes great, the MSK-B signal is changed to the 'L' level, and the image data processing module B is automatically allowed to use the bus 101. In this way, the use of the bus 101 is switched among the image data processing modules A through C, so that the image data processing operations are performed in parallel. If the processing in a subsequent module is slower, the DMA request signal from the subsequent module is not masked so that the subsequent module is allowed to keep processing until the processing is completed.

For the image data processing modules B and C, when the vertical count value (Y-BO) from the coordinate counter 24 of a previous data processing module is greater than the set value (actuation delaying signal DLY-BC) in the register, the sign bit (i.e., the MSK-C signal) of the subtracter 272 is at a 'H' level and a mask for DREQ-C is removed, so that the image data processing module C starts image data processing.

As described above, according to Example 1, a bus is shared by a plurality of image data processing modules A through C which performs a series of image data processing. A difference between a count value such as a Y coordinate of data and the predetermined number of delayed lines is controlled so that the difference is not less than a given constant value. Therefore, a subsequent image data processing module can start partway through the image data processing by a previous image data processing module. If the bus is sufficiently fast, the image data processing modules A through C process data in parallel, thereby reducing the time required for the series of image data processing. Further, the above-described control of the count values allows no-overtake control, even when the image data processing rate of a subsequent image data processing module is faster than that of a previous image data processing module.

EXAMPLE 2

Figure 5:
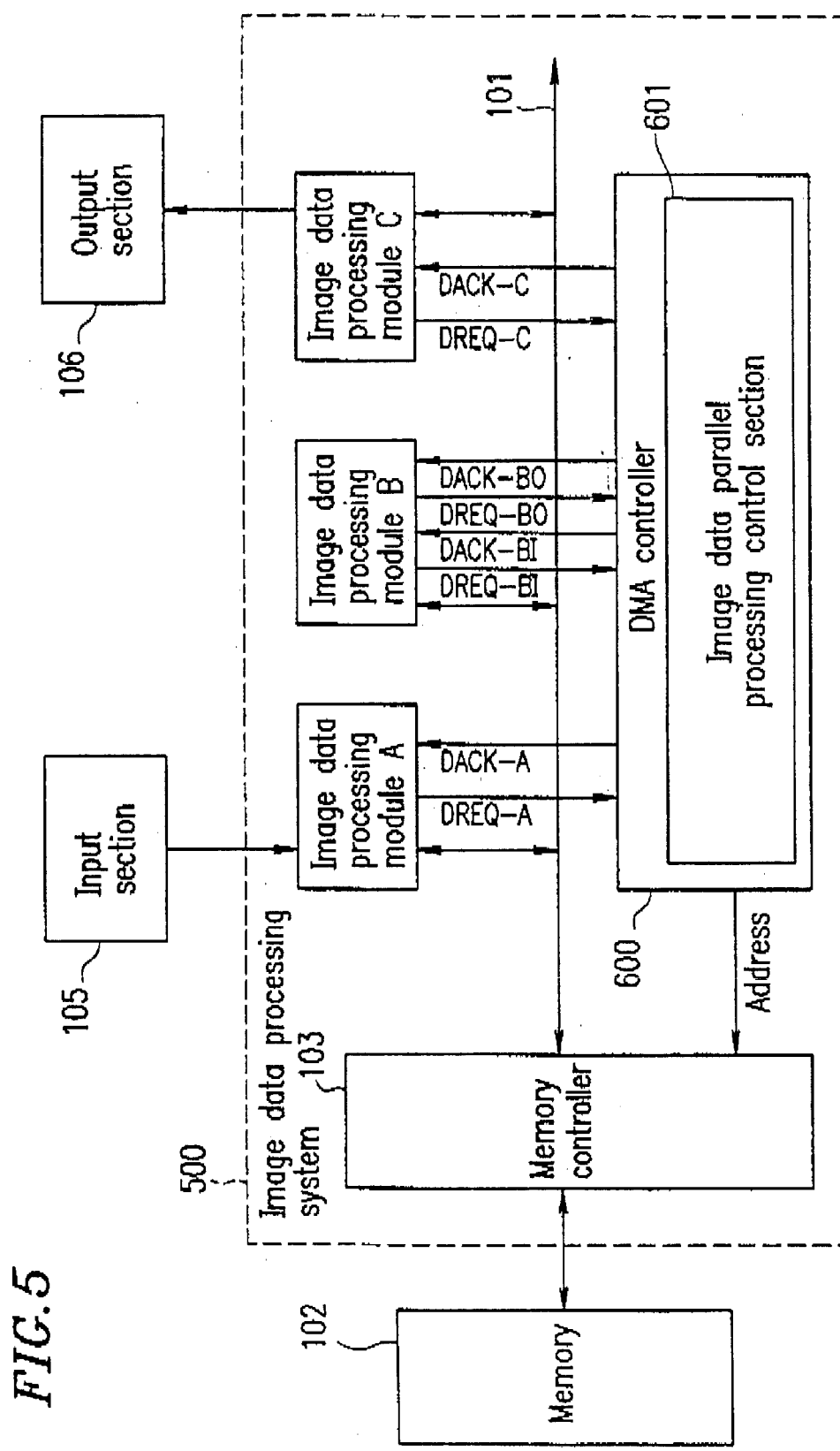
FIG. 5 is a block diagram illustrating an example structure of an image data processing system according to Example 2 of the present invention.
Figure 6:
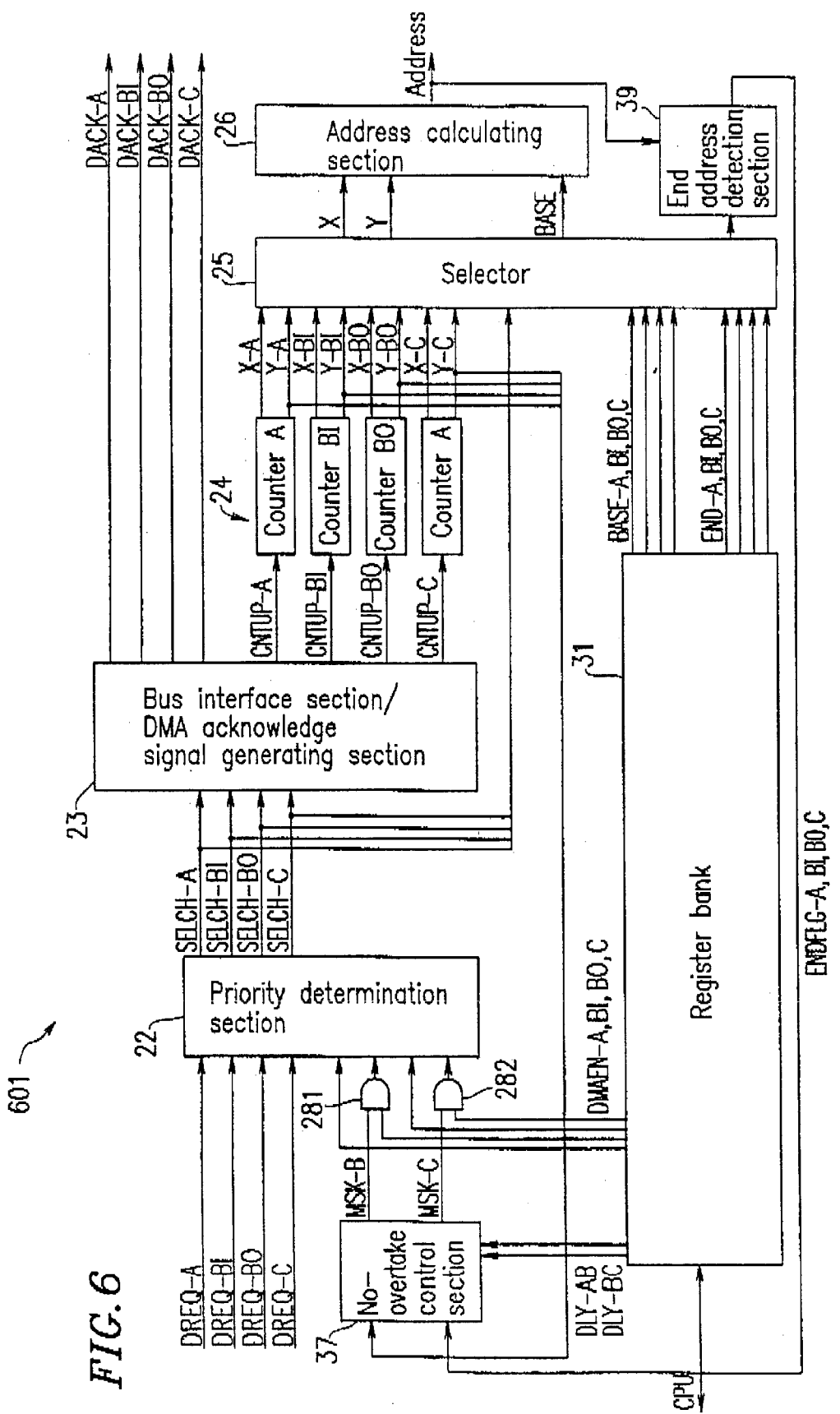
FIG. 6 is a block diagram illustrating a structure of an image data parallel processing control section shown in FIG. 5.

FIG. 5 is a block diagram illustrating an example structure of an image data processing system 500 according to Example 2 of the present invention. FIG. 6 is a block diagram illustrating a structure of the image data parallel processing control section 601 of FIG. 5. Components functioning similarly to the corresponding components shown in FIGS. 5 and 6 are designated by the same reference numerals as used in FIGS. 1 and 3. The description of such components is therefore omitted. The DMA controller 600 includes an image data parallel processing control section 601.

In FIGS. 5 and 6, an image data processing system 500 includes: image data processing modules A through C; a bus 101; a memory controller 103; and a DMA controller 600. The image data parallel processing control section 601 of the image data processing system 500 includes a register bank 31, a priority determination section 22, a bus interface section/DMA acknowledge signal generation section 23, a plurality of coordinate counters 24, a selector 25, an address calculating section 26, a no-overtake control section 37, and an end address detection section 39. The image data parallel processing control section 601 performs no-overtake control in which the vertical count values (Y-A, Y-BI, Y-BO, Y-C) of each channel are compared with one another.

The register bank 31 outputs to the selector 25 an end address (END-A, END-BI, END-BO, END-C) which is allowed to be set in a register of the DMA controller 600. An end address is an address for image data finally scanned.

Figure 7:
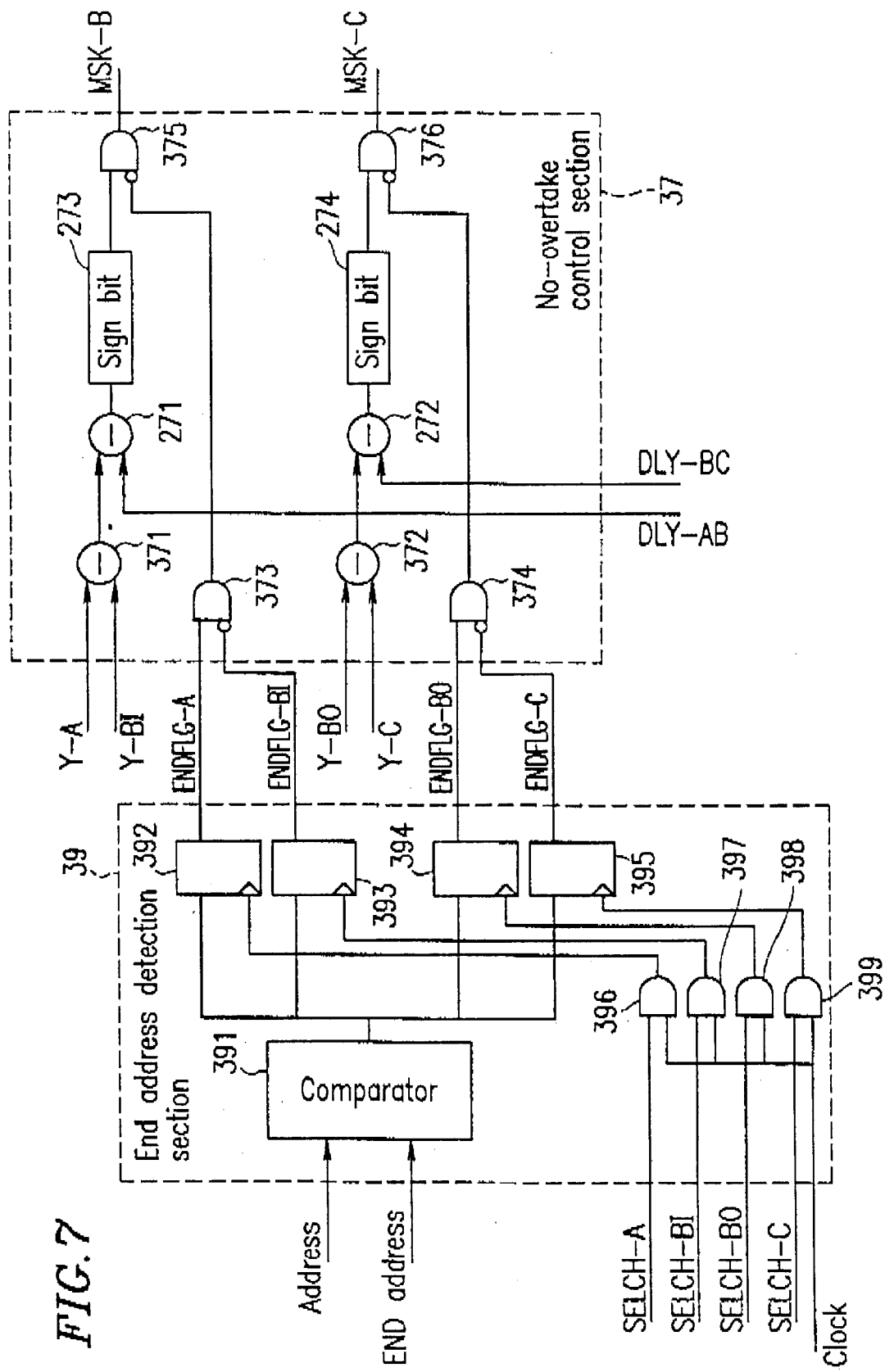
FIG. 7 is a block diagram illustrating structures of an end address detection section and a no-overtake control section shown in FIG. 6.

FIG. 7 is a block diagram illustrating a structure of the end address detection section 39 and the no-overtake control section 37.

The no-overtake control section 37 includes subtracters 271, 272, 371 and 372, AND gates 373 through 376, and most significant sign bit detectors 273 and 274.

When a subsequent data processing module has a faster processing rate than that of a previous data processing module, the no-overtake control section 37 calculates a difference between the coordinate counters (Y-A and Y-BI) controlled by the image data parallel processing control section 601 using the subtracter 371, and calculates, using the subtracter 271, a difference between the difference between the coordinate counters (i.e., the output of the subtracter 371) and the number of delayed lines (actuation delaying signal DLY-AB). The output of the subtracter 271 is input to a most significant sign bit detector 273. The most significant sign bit detector 273 outputs the most significant sign bit of the output of the subtracter 271. Further, when a subsequent data processing module has a faster processing rate than that of a previous data processing module, the no-overtake control section 37 also calculates a difference between the coordinate counters (Y-BO and Y-C) controlled by the image data parallel processing control section 601 using the subtracter 372, and calculates, using the subtracter 272, a difference between the coordinate counters (i.e., the output of the subtracter 372) and the number of delayed lines (actuation delaying signal DLY-BC). The output of the subtracter 272 is input to a most significant sign bit detector 274. The most significant sign bit detector 274 outputs the most significant sign bit of the output of the subtracter 272.

Further, in the no-overtake control section 37, an AND gate 373 receives end flags (ENDFLG-A, $\overline{\text{ENDFLG-BI}}$), while an AND gate 374 receives end flags (ENDFLG-BO, $\overline{\text{ENDFLG-C}}$). Furthermore, in the no-overtake control section 37, an AND gate 375 receives a most significant sign bit from the most significant sign bit detector 273 and an inverted signal of the output of the AND gate 373, while an AND gate 376 receives a most significant sign bit from the most significant sign bit detector 274 and an inverted output of the AND gate 374.

The end address detection section 39 includes a comparator 391, flip flops 392 through 395, and AND gates 396 through 399. In the end address detection section 39, of the end address signals (END-A, END-BI, END-BO, END-C), an end address for an enabled channel which is selected by the selector 25 in accordance with the select channel signal (SELCH-A, SELCH-BI, SELCH-BO, or SELCH-C) is compared with an address from the address calculating section 26. When the address matches the end address, the comparison output is input to the flip flops 392 through 395 provided for the respective select channel signal (SELCH-A, SELCH-BI, SELCH-BO, SELCH-C). Any of the flip flops 392 through 395 which is caused to be enabled by the select channel signal (SELCH-A, SELCH-BI, SELCH-BO, SELCH-C) outputs any of end flag signals (ENDFLG-A, ENDFLG-BI, ENDFLG-BO, ENDFLG-C).

The operation of the above-described structure will be described below. In the no-overtake control section 37, a difference in the vertical count value output from subsequent and previous data processing modules, i.e., (Y-BI)—(Y-A), is calculated by the subtracter 371 (which actually performs subtraction). For the image data processing modules A and B, for a period of time in which the difference in the vertical count value output from subsequent and previous data processing modules, i.e., (Y-BI)—(Y-A), is less than a set value (actuation delaying signal DLY-AB) in the register, the sign bit of the output of the subtracter 271 is used to generate a mask signal (MSK-B) for the request signal DREQ-BI, thereby performing the no-overtake control. When the vertical count value (Y-A) becomes great and the image data processing module B starts using the bus, if the image data processing module B has a faster processing rate than that of the image data processing module A and the count value difference (Y-A)—(Y-BI) is less than or equal to a constant value (DLY-AB), the MSK-B signal is changed again to the 'H' level, thereby automatically prohibiting the image data processing module B from using the bus. Therefore, the request signal from the image data processing module B is denied.

For the image data processing modules C and B, for a period of time in which a difference in the vertical count value output from subsequent and previous data processing modules, i.e., (Y-C)—(Y-BO), calculated by the subtracter 372 (which actually performs subtraction) is less than a set value (actuation delaying signal DLY-BC) in the register, the sign bit of the output of the subtracter 272 is used to generate a mask signal (MSK-C) for the request signal (DREQ-C), thereby performing the no-overtake control.

Thereafter, when the previous image data processing module completes the data processing (ENDFLG-A='H'), MSK-B is forced to be set to 'L', and no-overtake control is ended. Therefore, the image data processing module B can access at intervals less than or equal to DLY-AB, thereby making it possible to accomplish data processing until final data is outputted by a subsequent data processing module.

When an input operation to an image data processing module is completed and ENDFLG-BI is equal to 'H', the no-overtake control is caused to be enabled again and ready for next image data processing. Similar control is conducted for the image data processing modules B and C. Therefore, even when a subsequent image data module has a faster processing rate than that of a previous image data module, the parallel processing can be achieved, resulting in a reduction in the overall processing time.

As described above, according to Example 2, even when a subsequent image data module has a faster processing rate than that of a previous image data module, no pass control can be achieved. To this end, when a difference between a count value for a coordinate in a previous data processing, module and a count value for a coordinate in a subsequent image data processing module reaches a predetermined value set in the DMA controller 600 after the subsequent data processing has started, a request signal from the subsequent image data processing module is ignored. If the difference between each count value is continuously controlled so as not to be less than or equal to a predetermined value after the previous data processing module has completed its task, the subsequent data processing module cannot complete its task. To avoid this, the completion of the data processing in the previous data processing module is determined by detecting that an address generated by the DMA controller 600 reaches a predetermined value, and the no-overtake control is disabled so that final data can be subjected to data processing. Similarly, when the completion of data processing in a subsequent data processing module is detected, no-overtake control is caused to be enabled again for next data processing.

As described above, completion of data processing in a previous data processing module is detected by comparing an end address with a set value, and no-overtake control is disabled. Therefore, it is possible to access a region in which a count value involving address generation in a subsequent image processing module is less than or equal to a difference determined in the no-overtake control. Therefore, a subsequent data processing module can process up to final data.

In Examples 1 and 2, for example, the image data processing module A receives digital data output from a CCD, processes the data, and writes a result of the data processing into the external memory 102. The image data processing module B isolates a brightness component and a color component from a result of the data processing of the image data processing module A. The image data processing module C subjects a result of the data processing of the image data processing module B to JPEG compression. In this case, the data input rate (e.g., about 15 MHz) of the image data processing module A is typically a fraction of the write rate of the image data processing module A into the memory 102, so that the image data processing module A uses the bus 101 at constant intervals. Thus, the bus 101 is not jammed.

An available frequency of the bus 101 is about 50 MHz, for example. The image data processing module B does not also use the bus 101 in processing data, so that the bus 101 is intermittently used. The processing rates of the image data processing modules B and C are faster than that of the image data processing module A. Accordingly, when the image data processing modules A through C are simultaneously actuated and no-overtake control is conducted, the image data processing module B uses the bus 101 if the image data processing module A does not use the bus 101, and the image data processing module C uses the bus 101 if the image data processing modules A and B do not use the bus 101. Therefore, the image data processing of all the image data processing modules A through C can be sped up.

Further, the image data processing system of the present invention can utilize an external, vast memory via a shared bus. Therefore, even if processing in a subsequent data processing module is jammed, a previous data processing module can continue its processing.

Furthermore, no-overtake control is applied to the input of a subsequent data processing module so that a coordinate and an address output from the subsequent data processing module does not occur at an interval which is smaller than a predetermined amount relative to a coordinate and an address output from a previous data processing module. Therefore, the head address output from the subsequent data processing module is set to a small address which occurs at the above-described distance or more from the head address output from the previous data processing module so that memory regions used by the image data processing modules are overlapped with one another as much as possible. In this case, data processing is sequentially conducted. Therefore, the required capacity of the memory can be reduced as compared to when each image data processing module requires a memory corresponding to an entire image. For example, if the image data processing module C outputs to the memory 102 and the amount of input data of the image data processing module B is substantially equal to the amount of output data of the image data processing modules C, addresses are assigned to the memory 102 as shown in FIG. 2.

In Examples 1 and 2, count values are compared with each other. Alternatively, memory address values may be compared with each other.

An image data processing module may perform DMA transmission in units of a small rectangular region (e.g., a unit of 19 lines are processed together for filtering or the like), although this is not described in Examples 1 and 2. In this case, the first lines of small rectangular regions are compared with each other. Further, when both previous and subsequent data processing modules transfer small rectangular regions, a count value such as the number of blocks in the vertical direction may be used for the comparison.

In Examples 1 and 2, the image data processing system includes three image data processing modules as an example. Alternatively, two, or four or more, image data processing modules may be used.

Further, in a series of image data processing, a data stream input from a CCD may be divided into components according to color, the data may be processed from color component to color component, the processed color component may be compressed and encoded into a bit stream (i.e., compressed data), and the like, i.e., processing flows may be branched or combined, although this is not described in Examples 1 and 2. In this case, there would be more than one image data processing line. For example, input data from a CCD or the like is divided into a brightness component and a color component which are subjected to different processing. In other words, a certain image data processing module has a plurality of outputs, or conversely, a plurality of inputs and a single output. Even in such a case, if a count value difference does not exceed a certain set value, the overall data processing can be sped up.

Although image data processing systems are described in Examples 1 and 2, the present invention is not limited to an image data processing system. The present invention may be applied to a case where data in a memory is subjected successively to a series of different processing. Image data normally consists of a great amount of data (a continuous, large area in terms of memory address), compared with typical data. In this case, a reduction in processing time is significant in the present invention. Further, in this case, transfer of data stored in a memory via a shared bus is controlled by a DMA controller.

Further, the subtracters 371 and 372 of FIG. 7 in Example 2 may be provided at an input terminal of the no-overtake control section 27 of FIG. 4 of Example 1 so as to input difference signals (outputs of an subtracter) to the respective subtracters 271 and 272, although this is not described in Examples 1 and 2. With such an arrangement, even when the data processing rate of a subsequent data processing module is faster than the data processing rate of a previous data processing module, the subsequent data processing module can be prevented from overtaking the previous data processing module. Therefore, data processing can be satisfactorily conducted in previous and subsequent data processing modules.

Conventional pipeline structure can perform parallel processing, but does not have flexibility when it is applied to LSI. Such a problem is solved by the present invention, although this is not described in Examples 1 and 2.

As described above, when a bus is sufficiently fast for each data processing operation, data input and data output of a previous data processing module are intermittent, so that a DMA controller allows another data processing module to receive or output data. Therefore, even when each data processing operation has a different rate, the previous data processing operation and the subsequent data processing operation can be conducted in parallel, and the overall processing time required for the entire image data processing can be reduced.

Further, even when the data processing rate of a subsequent data processing module is faster than that of a previous data processing module, the subsequent data processing module can be prevented from overtaking the previous data processing module. Therefore, data processing can be satisfactorily conducted in previous and subsequent data processing modules.

Furthermore, if a difference between each count value is continuously controlled so as not to be less than or equal to a given value after a previous data processing module has completed its task, a subsequent data processing module cannot complete its task. To avoid this, no-overtake control is disabled so that final data can be subjected to data processing.

Even furthermore, data processing may not be a single line. For example, input data from a CCD or the like may be divided into a brightness component and a color component which are subjected to different processing. In other words, a certain image data processing module may have a plurality of outputs, or conversely, a plurality of inputs and a single output. Even in such a case, data processing can be sped up. Even when data processing is not always sequential and includes processing branches, the data processing can be sped up.

Still furthermore, the data processing system of the present invention can be easily and satisfactorily applied to an image data processing system. Especially in the case of image data, since image data normally consists of a great amount of data compared with typical data, a reduction in processing time is significant in the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data processing system comprising:

a plurality of data processing modules for performing a series of data processing, wherein each of the plurality of data processing modules processes data;

a bus connected to each of the plurality of data processing modules;

a memory controller for writing the data processed by each of the plurality of data processing modules into a memory via the bus, and for reading out the written data from the memory via the bus;

a DMA controller for determining operation of each of the plurality of data processing modules, and outputting an address to the memory controller, the data processed by said data processing module being written at the address and the DMA controller including a data parallel processing control section;

wherein: the plurality of data processing modules includes first and second data processing modules, and the second data processing module is subsequent to the first data processing module in the series of processing; and the DMA controller has a coordinate counter for managing the address, and according to a value of the coordinate counter, the DMA controller controls the first and second data processing modules so that the second data processing module starts data processing before the first data processing module completes data processing.

2. A data processing system according to claim 1, wherein the data parallel processing control section includes a no-overtake control section, wherein when the second data processing module has a faster processing rate than that of the first data processing module, no pass control is applied to the second data processing module so that the second data processing module is prevented from overtaking the first data processing module in terms of the data processed.

3. A data processing system according to claim 2, wherein the no-overtake control section ends operation of the no-overtake control after the first data processing module completes data processing.

4. A data processing system according to claim 1, wherein in the series of data processing, a plurality of processing lines branch from a single processing line.

5. A data processing system according to claim 1, wherein in the series of data processing, a plurality of processing lines are merged into a single processing line.

6. A data processing system according to claim 1, wherein the data processed in the series of data processing is image data.

7. A data processing method for use in a data processing system including a plurality of data processing modules each connected to a bus, and a DMA controller for controlling each of the plurality of data processing modules, the plurality of data processing modules including first and second data processing modules, the method comprising the steps of:

a) processing data using the first data processing module; and b) processing the data processed by the first data processing module, using the second data processing module before the first data processing module completes data processing;

wherein the DMA controller controls the second data processing module so that in step b, the second data processing module is prevented from overtaking the first data processing module in terms of the data processed.

* * * * *